though the known insulated electric conductors are somewhat

United States Patent Office 3,415,903
Patented Dec. 10, 1968

3,415,903
ELECTRICAL CONDUCTORS PREPARED FROM POLYESTERS CONTAINING TRIS-(2-HYDROXY-ETHYL)-ISOCYANURATE OR TRIS-(2-CARBOXY-ETHYL)-ISOCYANURATE REACTED WITH POLYESTERAMIDES
Heinz Bottger, Hettenhain, Taunus, Germany, assignor to Cella-Lackfabrik Dr. C. Schleussner G.m.b.H., Wiesbaden-Beibrich, Germany
No Drawing. Filed Aug. 25, 1965, Ser. No. 482,608
15 Claims. (Cl. 260—857)

ABSTRACT OF THE DISCLOSURE

A resin and its method of preparation in which a polyester is reacted with a condensation product, the polyester being the reaction product of terephthalic acid, at least one polyvalent alcohol and at least one isocyanurate derivative selected from the group consisting of tris-(2-hydroxyethyl)-isocyanurate and tris-(2-carboxyethyl)-isocyanurate, the condensation product being the reaction product of trimellitic acid, triethylene glycol and an aromatic diamine. The molar ratio of terephthalic acid to isocyanurate is about 1:0.5 and the proportion by weight of the polyester to condensation product is about 1:1.

The present invention relates to electric conductors, composed, for example, of metal wires having a synthetic-resin insulation, and to methods of producing such conductors and the synthetic resin insulation. The insulation and its effectiveness as an insulator are of considerable importance, especially if the electric conductor is likely to be temporarily exposed to temperature overloads with the inherent risk of short-circuits caused thereby. Such transient overloads of temperature occur, for example, in windings in electric machines which are subjected to increased starting torques, such as, for example, in the case of windings, in drilling machines and kitchen utensils, whereat the so-called resistance to arcing is very important, since the windings may be temporarily heated to temperatures in excess of 300° C. during the overload. The synthetic resin insulations must not decompose or volatilize at such temperatures, since this would cause short-circuits.

It is known in the art to provide a synthetic-resin insulation on electric conductors, said insulation consisting of a hydroxy group containing terephthalic acid polyester, which is interlaced by the addition of an isocyanurate derivative from trimerized di-isocyanate. Although these known insulated electric conductors are somewhat thermostable, their ability to resist an overload of temperature is rather limited. Consequently, the risk of arcing and of short-circuits in the case of temporary severe heating is not eliminated. It is also known to produce varnish insulations in such a manner that terephthalic acid polyester is reacted with the reaction products of polycarboxylic acids and diamines, but here again the ability to resist temperature overloads is very limited. Furthermore, these insulated electric conductors have a low mechanical strength, which often produces defects when these known electric conductors are used in windings under all but the most careful working conditions.

It is an object of the invention to provide a varnish which can be applied to a conductor to form an insulation coating thereon which avoids the above deficiencies associated with the known varnishes.

It is a further object of the invention to provide a method for producing a varnish which will satisfy the above requirements.

In greater particularity it is another object of the invention to provide electric conductors with an insulation having increased impact strength, increased life, high limiting temperature and an excellent resistance to short-circuits at temperatures above 300° C. and up to about 350° C. The present invention makes it possible to obtain electric conductors having these properties.

The thus insulated electric conductors with a synthetic resin insulation coating are characterized in that the insulation is a reaction product of a polyester composed of terephthalic acid, at least one polyvalent alcohol and at least one isocyanurate derivative selected from the group consisting of tris-(2-hydroxyethyl)-isocyanurate and tris-(2-carboxyethyl)-isocyanurate, with a condensation product consisting of trimellitic acid, triethylene glycol and an aromatic diamine.

It is understood that all of the compounds produced from the above-mentioned compound groups will vary somewhat in their desirable properties. It was found to be particularly expedient to use ethylene glycol as the polyvalent alcohol in the production of the varnish insulation. Aromatic diamines especially suited to obtain the condensation product with trimellitic acid and triethylene glycol are diamines having the formula:

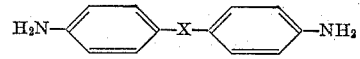

wherein X is $(CH_2)_n$, O, S, or $SO_2$, $n$ being an integer from 1 to 4. Particularly preferable are the aromatic diamines, diamino diphenyl methane, diamino diphenyl ether, diamino diphenyl propane, and diamino diphenyl sulfone.

It was further found that particularly high-quality insulated electric conductors are obtained when the molar ratio of the terephthalic acid groups to the isocyanurate groups is about 1:0.5 and if the proportion by weight of polyester to the condensation product consisting of trimellitic acid, triethylene glycol and aromatic diamine is about 1:1.

When processing insulated wires in winding systems, it is particularly important to eliminate mechanical loads occurring at high winding speeds, in order to keep the amount of rejects as small as possible. The degree of sliding property of a coated wire is of special importance, since the introduction of the individual coils into the grooves of the winding depends on said sliding property. It was found to be particularly advantageous to provide the insulated electric conductors according to the invention, when they are to be used for winding systems, with an additional coating which consists of a linear polyester consisting of terephthalic acid dimethyl ester, p-hydroxybenzoic acid and ethylene glycol, said additional coating being applied to and covering the insulating layer. Such an additional coating is preferably applied from a cresol solution to the insulating layer of the electric conductor.

The resulting electric conductors have not only an excellent surface smoothness, but also have very good impact strength; optimal properties can be obtained if the proportion of ether compounds in the linear polyester amounts to about 10%. Such polyesters can advantageously be obtained by vacuum condensation of terephthalic acid dimethyl ester, p-hydroxy-benzoic acid and ethylene glycol.

Generally, the insulated electric conductors according to the invention have an increased impact strength, a life limiting temperature of up to 200° C. as well as resistance to short-circuits at temperatures up to 350° C. This makes these conductors particularly suitable for use in winding systems, where temporary temperature overloads above 300° C. are likely to occur.

The following examples and comparisons of the physical properties of the insulation according to the invention with those of known insulating varnish systems are intended to explain the invention and the special advantages resulting from the use of the produced insulated electric conductors.

Example 1

194 g. of dimethyl terephthalate, 62 g. of ethylene glycol, 130 g. of tris - (2 - hydroxyethyl) - isocyanurate and 1 g. of lithium naphthanate were reacted at a temperature of about 170° C., until 60 g. of methanol, which distilled off, had been separated.

Separately, 192 g. of trimellitic anhydride and 186 g. of triethylene glycol were esterified at a temperature of about 170° C. to an acid number of less than 50 and was subsequently mixed with 150 g. of diamino diphenyl methane. After the temperature had been increased to 200° C., a viscous product was obtained which still contained free amine and hydroxyl groups; 300 g. of said product was used for the reaction with the initially produced polyester. The reaction of said polyester with the condensation product prepared from trimellitic acid, triethylene glycol and diamino diphenyl methane was effected at temperatures of about 220° C., until the viscosity of a 35% solution of the resin in cresol amounted to 2500 cp.

35 parts by weight of this resin was mixed with 45 parts by weight of cresol, 19 parts by weight of naphtha solvent, and one part by weight of polymeric butyl titanate and thus processed to form a varnish which was applied to an electric conductor wire in a manner known per se. By way of alternative, five wire passages were effected through the bath of insulating varnish followed by two wire passages through a bath of coating varnish, the latter being a condensation product of terephthalic acid dimethyl ester, p-hydroxy-benzoic acid and ethylene glycol having a 10% content of ester bonds. 0.6 mm. copper wires were used as electric conductors. The copper wires coated in this manner, with or without an additional layer of varnish to increase surface smoothness, were heated in a furnace to a temperature of 420° C., in order to bake the layers of varnish in the usual manner.

Example 2

194 g. of dimethyl terephthalate, 170 g. of tris-(2-carboxyethyl)-isocyanurate, 186 g. of ethylene glycol and 1 g. of lithium naphthenate were esterified, as described in Example 1, at about 170° C. to an acid number of less than 50 and were subsequently mixed with 300 g. of a condensation product of trimellitic acid, triethylene glycol, and diamino diphenyl methane, obtained as per Example 1, and were then condensed to a viscosity of 25,000 cp. at temperatures of about 220° C. The production of the wire varnishes and the applying to copper wires having a thickness of 0.6 mm. also was effected in the manner described in Example 1.

For the sake of comparing the physical properties of the insulated electric conductors produced according to the invention with known insulated electric conductors, the following two insulating varnishes were produced according to known methods:

Comparative Example 3

27 parts by weight of Desmophen F 950 (terephthalic acid polyester of Farbenfabriken Bayer, Leverkusen), 8 parts by weight of Desmodur CT (blocked trimerized isocyanate), 19 parts by weight of naphtha solvent, and 1 part by weight of polymeric butyl titanate were dissolved in 45 parts by weight of cresol.

Comparative Example 4

115 g. of trimellitic anhydride were dissolved in 500 g. of cresol at 150° C. after which 60 g. of diamino diphenyl methane were added. This mixture was kept at a temperature of 140° C. for six hours, whereupon the precipitating crystals were isolated by filtration and by repeated washing with alcohol and ether.

Separately, 385 g. of dimethyl terephthalate, 112 g. of ethylene glycol, and 75 g. of glycerin were reacted; after 137 g. of the product obtained from the reaction of the trimellitic anhydride and the diamino diphenyl methane, as described above, had been added, the mixture was condensed in vacuo at 215° C.

In order to obtain a wire varnish, 35 parts by weight of said condensation product were dissolved, together with 1 part by weight of polymeric butyl titanate, in 45 parts by weight of cresol and 19 parts by weight of solvent naphtha.

The wire varnishes obtained according to the Comparative Examples 3 and 4 were applied, in a known manner, to copper wires having a thickness of 0.6 mm. and were baked at a furnace temperature of 420° C.

A comparison of the physical properties showed that the insulated electric conductors according to the invention showed a substantially better thermal compressive strength, thermal stability under load, and Emerson abrasion resistance, as well as having an increased life limiting temperature as compared to the known insulated electric conductors. The physical properties are listed in the table below. In this table, the varnishes 1 and 2 are the wire varnishes obtained according to Examples 1 and 2 of the invention without the coating layer, while the varnishes 3 and 4 are the varnishes obtained according to the Comparative Examples 3 and 4.

TABLE

| Varnish | 1 | 2 | 3 | 4 |
| --- | --- | --- | --- | --- |
| Furnace temperature during baking (° C.) | 420 | 420 | 420 | 420 |
| Diameter of wire (mm.) | 0.6 | 0.6 | 0.6 | 0.6 |
| Increase due to varnish (mm.) | 0.04 | 0.04 | 0.04 | 0.04 |
| Velocity of withdrawal (in./min.) | 7 | 8 | 4 | 5 |
| Maximum outer fiber extensibility, percent | 100 | 100 | 80 | 100 |
| Maximum outer fiber extensibility after aging for 50 hrs. at 200° C., percent | 60 | 40 | 80 | 35 |
| Maximum heat shock resistance of a single winding roll (° C.) | 200 | 240 | 140 | 240 |
| Thermal compressive strength (° C.) | 300 | 340 | 280 | 260 |
| Thermal stability under load at 180° C. (at 500 volts and 500 g. load), hours | 100 | 100 | 40 | 20 |
| Stability under load of AIEE 510 Motor coils in short-circuit (min.) | 25 | 35 | 4 | 8 |
| Emerson abrasion resistance, pounds | 25 | 29 | 12 | 8 |
| Temperature break of the loss factor (° C.) | 190 | 210 | 130 | 170 |
| Life limiting temperature according to AIEE 57 (° C.) | 205 | 210 | 165 | 185 |

Numerous modifications and variations of the disclosed methods and products of the invention will become readily apparent to those skilled in the art without departing from the scope and spirit of the invention as defined in the attached claims.

What is claimed is:

1. A resin adapted for being applied to an electric conductor to insulate the same, said resin being obtained by reacting a polyester with a condensation product, said polyester being the reaction product of terephthalic acid, at least one polyvalent alcohol and at least one isocyanurate derivative selected from the group consisting of tris-(2-hydroxyethyl)-isocyanurate and tris-(2-carboxyethyl)-isocyanurate, said condensation product being the reaction product of trimellitic acid, triethylene glycol and an aromatic diamine.

2. A resin as claimed in claim 1, wherein said polyvalent alcohol is ethylene glycol.

3. A resin as claimed in claim 1, wherein the molar ratio of terephthalic acid to isocyanurate is about 1:0.5 and the proportion by weight of said polyester to said condensation product is about 1:1.

4. A resin as claimed in claim 1, wherein said aromatic diamine is a diamine of the general formula:

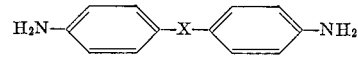

wherein X is $(CH_2)_n$, O, S, or $SO_2$, $n$ being an integer from 1 to 4.

5. A resin as claimed in claim 1, wherein said aromatic diamine is a diamino diphenyl methane, diamino diphenyl ether, diamino diphenyl propane, or diamino diphenyl sulfone.

6. A resin as claimed in claim 1, comprising an addition coating on said insulation coating which consists of a linear polyester obtained from the reaction of terephthalic acid dimethyl ester, p-hydroxy-benzoic acid and ethylene glycol.

7. A resin as claimed in claim 6, wherein said polyester of said addition coating has a content of ether bonds of about 10%.

8. A method of preparing a resin adapted for resisting transient temperatures up to 350° C., said method comprising reacting a polyester with a condensation product, said polyester being the reaction product of terephthalic acid, at least one polyvalent alcohol and at least one isocyanurate derivative selected from the group consisting of tris-(2-hydroxyethyl)-isocyanurate and tris-(2-carboxyethyl)-isocyanurate, said condensation product being the reaction product of trimellitic acid, triethylene glycol and an aromatic diamine.

9. A method as claimed in claim 8, wherein said polyvalent alcohol is ethylene glycol.

10. A method as claimed in claim 8, wherein the molar ratio of terephthalic acid to isocyanurate is about 1:0.5 and the proportion by weight of said polyester to said condensation product is about 1:1.

11. A method as claimed in claim 8, wherein said aromatic diamine is a diamine of the general formula:

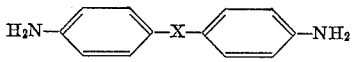

wherein X is $(CH_2)_n$, O, S, or $SO_2$, $n$ being an integer from 1 to 4.

12. A method as claimed in claim 8, wherein said aromatic diamine is diamino diphenyl methane, diamino diphenyl ether, diamino diphenyl propane, or diamino diphenyl sulfone.

13. A method as claimed in claim 9, comprising applying an addition coating on said insulation coating which consists of a linear polyester obtained from the reaction of terephthalic acid dimethyl ester, p-hydroxy-benzoic acid and ethylene glycol.

14. A method as claimed in claim 13, wherein said polyester of said addition coating has a content of ether bonds of about 10%.

15. A method as claimed in claim 8, wherein said condensation product is obtained by esterifying the trimellitic acid and the triethylene glycol to an acid number less than 50 and subsequently mixing the thus obtained ester with the aromatic diamine.

References Cited

UNITED STATES PATENTS

| | | | |
|---|---|---|---|
| 3,184,438 | 5/1965 | Phillips | 260—78 |
| 3,200,119 | 8/1965 | Hopkins | 260—75 |
| 3,211,585 | 10/1965 | Meyer et al. | 260—75 |
| 3,215,758 | 11/1965 | Hopkins | 260—75 |
| 3,249,578 | 5/1966 | Meyer et al. | 260—858 |
| 3,293,248 | 12/1966 | Sheffer | 260—75 |
| 3,312,573 | 4/1967 | Sheffer | 260—75 |
| 3,321,548 | 5/1967 | Sattler | 260—75 |
| 3,331,839 | 7/1967 | Little | 260—75 |
| 3,342,780 | 9/1967 | Meyer et al. | 260—22 |
| 3,345,429 | 10/1967 | Sattler | 260—75 |

MURRAY TILLMAN, *Primary Examiner.*

PAUL LIEBERMAN, *Assistant Examiner.*

U.S. Cl. X.R.

260—75, 78, 33.4, 33.6, 248, 868, 860